United States Patent [19]

Gibson

[11] Patent Number: 4,495,308

[45] Date of Patent: Jan. 22, 1985

[54] TWO-REGION SPHERICAL CATALYSTS

[75] Inventor: Kirk R. Gibson, El Cerrito, Calif.

[73] Assignee: Chevron Research Company, San Francisco, Calif.

[21] Appl. No.: 579,847

[22] Filed: Feb. 14, 1984

Related U.S. Application Data

[63] Continuation-in-part of Ser. No. 471,985, Mar. 4, 1983, abandoned.

[51] Int. Cl.³ .............................................. B01J 21/04
[52] U.S. Cl. ................................... 502/355; 502/314; 502/527; 208/216 PP
[58] Field of Search ...................... 502/527, 314, 355; 208/216 PP

[56] References Cited

U.S. PATENT DOCUMENTS

| | | | |
|---|---|---|---|
| 3,993,599 | 11/1976 | Mattox | 502/314 |
| 4,039,478 | 8/1977 | Cull et al. | 252/455 R |
| 4,070,283 | 1/1978 | Kirkland | 210/31 C |
| 4,077,912 | 3/1978 | Dolhyj et al. | 252/461 |
| 4,255,253 | 3/1981 | Herrington et al. | 208/216 PP |
| 4,293,449 | 10/1981 | Herrington et al. | 252/465 |
| 4,378,308 | 3/1983 | Angevine et al. | 252/455 R |
| 4,421,633 | 12/1983 | Sheh | 208/216 PP |
| 4,442,024 | 4/1984 | Crene | 502/355 |
| 4,443,558 | 4/1984 | Gibson | 502/314 |

*Primary Examiner*—Delbert E. Gantz
*Assistant Examiner*—Cynthia A. Prezlock
*Attorney, Agent, or Firm*—S. R. Lapaglia; W. K. Turner; D. P. Freyberg

[57] ABSTRACT

A spherical catalyst for hydroprocessing hydrocarbonaceous feedstocks. The catalyst consists of an inner region having less than 5% of its port volume contributed by macropores and having between 5 and 30 weight percent total catalytic metals, and an outer region characterized by having more than 10% of its pore volume contributed by macropores and having between 1 and 15 weight percent catalytic metals. A method of preparation of the catalyst is also disclosed.

12 Claims, No Drawings

TWO-REGION SPHERICAL CATALYSTS

CROSS-REFERENCE TO RELATED APPLICATIONS

This application is a continuation-in-part of my copending application Ser. No. 471,985, filed Mar. 4, 1983, now abandoned, which is incorporated herein by reference.

BACKGROUND OF THE INVENTION

This invention relates to hydroprocessing catalysts and methods of making them.

As petroleum reserves dwindle, refiners must process the heavier feedstocks, high in alphaltenes, metals and sulfur, that remain. These feedstocks are notable because they contain high levels of impurities and low hydrogen to carbon ratios. Most methods of treating these feedstocks involve treating them with molecular hydrogen in the presence of a hydroprocessing catalyst. The typical hydroprocessing catalyst is a Group VIII metal and a Group VIB metal (Handbook of Chemistry and Physics, 51st Ed., Chemical Rubber Co., Cleveland, Ohio, 1970) supported on a refractory inorganic oxide. It is known that pore sizes, catalyst surface area and amounts of metals all contribute to the catalyst's activity and that a catalyst which is very active for one feedstock may be inactive or very rapidly fouled by another feedstock. Therefore, it has been suggested that poor quality feedstocks be passed over beds of several different catalysts, thereby most advantageously utilizing each particular catalyst and removing the impurities in the feedstock that might deactivate the next catalyst in the sequence. Typically, the first catalyst in such a sequence has a large average pore diameter and a significant fraction of the pore volume as macropores, with a relatively low catalytic metals loading. As used herein, "macropore" refers to pores having diameters larger than 1000 Å. Such a catalyst is suitable for removing some contaminant metals, asphaltenes, and sulfur from the feedstock. The feedstock so processed is then contacted with a second catalyst having a smaller average pore diameter and a small macropore volume fraction, with a higher catalytic metals loading. Such a catalyst is more active for removing sulfur. Other smaller pored and even more active catalysts may be added in turn, removing yet more sulfur and thereby providing a relatively high-quality, low-impurity product, suitable for hydrocracking or distillation into products.

This invention provides catalyst particles that are individually layered thereby providing the effect of several beds of different catalyst in one bed of catalyst.

SUMMARY OF THE INVENTION

This invention provides a catalyst for hydroprocessing hydrocarbonaceous feedstocks comprising:
  an inner region of catyst characterized by having less than 5% of the pore volume contributed by macropores and comprising between 5 and 30 weight percent total catalytic metals supported on a refractory inorganic oxide; and
  an outer region of catalyst characterized by having more than 10% of the pore volume contributed by macropores and having between 1 and 15 weight percent total catalytic metals supported on a refractory inorganic oxide.

DETAILED DESCRIPTION

Heavy hydrocarboncaeous feedstocks, including crudes, both atmospheric and vacuum residua, and synthetic liquids from both coal and oil shale, are in need of upgrading before they can be utilized as light transportation fueld or fuel oils. The heavy fractions tend to contain high concentrations of sulfur and contaminant metals, primarily nickel, vanadium, and iron. They also contain a portion of the oil known as "asphaltenes". Asphaltenes, as used herein, are defined as the n-heptane insoluble portion of the feedstock, and typically contain particularly high concentrations of contaminant metals and sulfur. The heavy feedstocks also generally have low hydrogen to carbon ratios, therefore requiring some amount of molecular hydrogen input before they can be converted to lower molecular weight products.

The catalysts used to hydrogenate hydrocarbonaceous feedstocks typically comprise catalytic metals supported on a refractory inorganic oxide. The catalytic metals comprise Group VIII metals, particularly nickel and cobalt, and Group VIB metals, particularly molybdenum and tungsten. The supports are typically alumina or silica. The catalyst of this invention can have any desired combination of Group VIII and/or Group VIB metals, for example, cobalt with molybdenum.

The catalyst particles of this invention will contain at least two different regions which differ in pore size and may differ in metals loading. The support of one region of the catalyst need not be of the same refractory inogranic oxide as the support of the other region. For example, the inner region could be supported on silica, and the outer on alumina.

The formation of the outer region of the catalyst of this invention requires the coating of a preformed substantially spherical "seed", which will become the inner region, with a second catalyst. The inner region can be a dried catalyst support with or without catalytic metals, or a calcined catalyst support with or without catalytic metals. It is therefore, possible to use a formed catalyst as the seed for the catalyst of this invention. The inner region will typically have smaller pores, and fewer macropores, than the outer region. The calculated geometric pore diameters (CGPD) can be calculated by the equation:

$$CGPD = (4 \times PV \times 10^4)/SA$$

where PV is the pore volume as calculated from the equation:

$$PV = (1/\text{Particle Density}) - (1/\text{Skeletal Density})$$

where Particle Density is the density of the particles, Skeletal Density is the Particle Density minus the contribution of Pore Volume, and SA is the nirogen adsorption surface area. The seed may be made by any method known to the art so long as it is substantially spherical. Extrudates which are typically quite elongated can be marumerized to produce the necessary seed particles. A finished two-region catalyst will typically have an inner region with an average geometric pore diameter between 50 and 200 Å and a surface area between 100 and 300 m²/g, and and outer region with an average geometric pore diameter between 100 and 300 Å, and a surface area between 100 and 300 m²/g.

The seed particles are then placed in an apparatus herein termed as "spheridizer". A tiltable drum containing refractory inorganic powder is rotated and peptizing agent dripped onto one area. The powder at this area becomes sticky and forms spheres which roll in the tray until the desired size is reached. In the practice of this invention seed particles are placed in the tray. Powder in the rotating tray then coats them, forming particles with two regions. The outer region tends to have a high percentage of macropores compared to the inner region. One observed property of particles agglomerated in the spheridizer is the particles of a very narrow size range can be made. The size range can be changed by changing the tilt angle of the drum. In this way, if the initial seed particles are carefully sorted as to size, the final two-region particles will have precise, predictable amounts of both regions. It is preferred in the practice of this invention that the ratio of the volume of the inner region to the volume of the outer region be in the range of 1:2 to 2:1. When the two volumes are nearly the same, the outer region is relatively thin thereby allowing rapid diffusion of the feedstock into the inner region.

The finished catalyst particles will contain amounts of catalytic metals. The amounts of catalytic metals can be varied, forming catalysts that can provide desired product quality from a given feedstock. Some catalytic metals can already be loaded onto the seed. They can be placed there by any method known to the art, for example, comulling, impregnation or cogellation. The seed may contain between 0 and 30 weight percent, usually between 0 and 15 weight percent of catalytic metals. As used herein, the term "weight percent" refers to the percentage by weight of the catalytic metals (expressed as reduced metal) to the weight of the appropriate region of the catalyst, including those metals. When the final two region support is formed, catalytic metals may be impregnated onto the particle. If catalytic metals have already been loaded onto the inner region, impregnation will provide a two-region catalyst with lower metals level on the outer region and higher metals level on the inner region. The inner region of the catalyst will have between 5 and 30 weight percent, preferably between 10 and 20 weight percent, catalytic metals. The outer region will have between 1 and 15 weight percent, preferably between 3 and 10 weight percent, catalytic metals.

If the outer region of the catalyst is to have a catalytic metals loading near the lower limit of 1 weight percent, it will be necessary for the seed which is to become the inner region to have been loaded with catalytic metals to such an extent that when the outer region support has been added and the whole particle impregnated with catalytic metals, the final catalytic metals loading in the inner region is at least 5 weight percent. Though it is possible, if the outer region is to have more than 5 weight percent catalytic metals, for both the outer and inner regions to have the same catalytic metals loading, it is generally preferred that the inner region have a higher loading, so that the seed will generally already be loaded with catalytic metals.

It is also possible to prepare the two-region catalyst of this invention by coating an already metal-loaded seed with a metal-loaded powder (rather than just a catalyst support material) in a spheridizer, in the manner discussed above. Further impregnation of the two-region catalyst thus formed is still possible, if desired. The fine metals content of the two regions should be as disclosed above.

The mode of operation is believed to be the removal of a greater proportion of metals and asphaltenes by the outer region, and the removal of a greater proportion of sulfur by the inner region. Since sulfur is generally harder to remove, the inner region preferably has higher intrinsic activity.

The primary mode of demetalation appears to be laying down of contaminant metal atoms on the surface, or in the pores, of the catalyst, whereas the primary mode of desulfuration appears to be hydrogenation of sulfur with subsequent removal from the feedstream. It can thus be seen that a first stage catalyst with large pores would retain demetalation activity longer than a catalyst with small pores, since the pores do not become clogged with deposited metals as rapidly. By removing metals, the outer region catalyst prolongs the life of the inner region catalyst. A bed of single multi-region catalyst particles thus has the effect of a plurality of layered catalyst beds. The outer region effectively removes metals from the feedstock. The now metal-free feedstock then diffuses into the more active inner region to remove residual sulfur.

The particles of this invention can be used in a fluidized or ebullated bed. In general, the catalyst of this invention will be useful under generic hydroprocessing conditions, which include reactions in the temperature range of about 200° to 540° C., a total pressure in the range of from about one atmosphere to about 300 atmospheres with hydrogen partial pressure up to about 200 atmospheres, a hydrogen to oil feed ratio of up to 9000 standard liters per liter of oil and a liquid hourly space velocity of about 0.1 to about 25 reciprocal hours. The precise conditions depend on the composition of the feedstock, the amount of contaminants tolerable, and the condition of the catalyst. The temperature may be slowly raised to compensate for the natural decrease in activity of the catalyst as metals and coke are deposited thereon from the feedstock.

What is claimed is:

1. A catalyst for hydroprocessing hydrocarbonaceous feedstocks comprising:
    an inner region of catalyst characterized by having less than 5% of the pore volume contributed by macropores and comprising between 5 and 30 weight percent total catalytic metals supported on a refractory inorganic oxide; and
    an outer region of catalyst characterized by having more than 10% of the pore volume contributed by macropores and comprising between 1 and 15 weight percent total catalytic metals supported on a refractory inorganic oxide.

2. The catalyst of claim 1 wherein said inner region is substantially spherical.

3. The catalyst of claim 1 wherein said outer region substantially encases said inner region.

4. The catalyst of claim 1 wherein said refractory inorganic oxide is alumina.

5. The catalyst of claim 1 wherein said inner region has an average geometric pore diameter between 50 and 200 Å and a surface area between 100 and 300 m$^2$/g.

6. The catalyst of claim 1 wherein said outer region has an average geometric pore diameter between 100 and 300 Å and a surface area between 100 and 300 m$^2$/g.

7. The catalyst of claim 5 wherein said outer region has an average geometric pore diameter between 100 and 300 Å and a surface area between 100 and 300 m$^2$/g.

8. A method of making a catalyst for hydroprocessing feedstocks comprising:

contacting a preformed catalyst support containing catalytic metals with a refractory inorganic oxide suitable for catalyst support while peptizing said refractory inorganic oxide;

forming substantially spherical two-region particles;

drying and calcining said two-region particles; and impregnating said particles with catalytic metals to produce catalyst particles.

9. The process of claim 8 wherein said preformed catalyst support is a dried, uncalcined refractory inorganic oxide.

10. The process of claim 8 wherein said preformed catalyst support is a calcined refractory inorganic oxide.

11. The process of claim 8 wherein said preformed catalyst support contains up to 15 weight percent of catalytic metals.

12. A method of making a catalyst for hydroprocessing feedstocks, which catalyst comprises:

(a) an inner region of catalyst characterized by having less than 5% of the pore volume contributed by macropores and comprising between 5 and 30 weight percent total catalytic metals supported on a refractory inorganic oxide; and (b) an outer region of catalyst characterized by having more than 10% of the pore volume contributed by macropores and comprising between 1 and 15 weight percent total catalytic metals supported on a refractory inorganic oxide, which method comprises:

contacting a preformed catalyst support containing catalytic metals with a refractory inorganic oxide suitable for catalyst support while peptizing said refractory inorganic oxide;

forming substantially spherical two-region particles;

drying and calcining said two-region particles; and impregnating said particles with catalytic metals to produce particles of said catalyst.

* * * * *

UNITED STATES PATENT AND TRADEMARK OFFICE
CERTIFICATE OF CORRECTION

PATENT NO. : 4,495,308
DATED : January 22, 1985
INVENTOR(S) : Kirk R. Gibson

It is certified that error appears in the above-identified patent and that said Letters Patent are hereby corrected as shown below:

On the title page:

Abstract, line 3, "port volume" should read --pore volume--.

Col. 2, line 56, "nirogen" should read --nitrogen--.

Col. 3, line 66, "fine metals" should read --final metals--.

Signed and Sealed this

Twenty-fifth Day of June 1985

[SEAL]

Attest:

DONALD J. QUIGG

Attesting Officer     Acting Commissioner of Patents and Trademarks